United States Patent
Russell et al.

(10) Patent No.: US 12,223,345 B1
(45) Date of Patent: Feb. 11, 2025

(54) MULTI-THREADED TRAFFIC SHAPER

(71) Applicant: GRAPHIANT, INC., Fremont, CA (US)

(72) Inventors: Brian Russell, Balerno (GB); Neale Ranns, Hure (FR)

(73) Assignee: GRAPHIANT, INC., Fremont, CA (US)

(*) Notice: Subject to any disclaimer, the term of this patent is extended or adjusted under 35 U.S.C. 154(b) by 591 days.

(21) Appl. No.: 17/576,828

(22) Filed: Jan. 14, 2022

(51) Int. Cl.
*G06F 9/48* (2006.01)
*H04L 47/215* (2022.01)
*H04L 47/22* (2022.01)

(52) U.S. Cl.
CPC .......... *G06F 9/4843* (2013.01); *H04L 47/215* (2013.01); *H04L 47/22* (2013.01)

(58) Field of Classification Search
None
See application file for complete search history.

(56) References Cited

U.S. PATENT DOCUMENTS

| | | | | |
|---|---|---|---|---|
| 7,764,615 B2* | 7/2010 | Gilfix | | H04L 67/61 |
| | | | | 370/408 |
| 8,565,086 B2* | 10/2013 | Chen | | H04L 47/10 |
| | | | | 370/233 |
| 9,166,918 B1* | 10/2015 | Frink | | H04L 47/30 |
| 9,385,958 B2* | 7/2016 | Flinta | | H04L 43/0882 |
| 10,756,829 B1* | 8/2020 | Therrien | | H04B 17/17 |
| 12,096,281 B2* | 9/2024 | Elazzouni | | H04L 47/801 |
| 2003/0107988 A1* | 6/2003 | Lodha | | H04L 47/2441 |
| | | | | 370/230.1 |
| 2008/0008095 A1* | 1/2008 | Gilfix | | H04L 67/1008 |
| | | | | 370/235 |
| 2008/0095053 A1* | 4/2008 | Chen | | H04L 47/10 |
| | | | | 370/230.1 |
| 2010/0091683 A1* | 4/2010 | Shimizu | | H04L 47/2483 |
| | | | | 370/253 |
| 2015/0195205 A1* | 7/2015 | Flinta | | H04L 43/0882 |
| | | | | 370/230.1 |
| 2017/0149678 A1* | 5/2017 | Dumitrescu | | H04L 47/527 |
| 2022/0264360 A1* | 8/2022 | Chen | | H04L 65/765 |
| 2023/0208735 A1* | 6/2023 | Ihlar | | H04L 47/22 |
| | | | | 709/224 |
| 2023/0308395 A1* | 9/2023 | Fukui | | H04L 47/22 |

OTHER PUBLICATIONS

Li et al.; "TrafficShaper: Shaping Inter-Datacenter Traffic to Reduce the Transmission Cost"; IEEE/ACM Transactions on Networking, vol. 26, No. 3, Jun. 2018; (Li_2018.pdf; pp. 1193-1206) (Year: 2018).*

Cnodder et al.; "Rate adaptive shaping for the efficient transport of data traffic in diffserv networks"; 2001 Elsevier Science B.V.; (Cnodder_2001.pdf; pp. 263-285) (Year: 2001).*

* cited by examiner

*Primary Examiner* — Hiren P Patel
(74) *Attorney, Agent, or Firm* — Maschoff Brennan

(57) ABSTRACT

Embodiments of a computing device for traffic shaping are disclosed. In an embodiment, the computing device includes one or more processor(s) coupled to a memory. The memory includes a set of instructions which when executed causes the one or more processor(s) to divide a burst period associated with a shaper queue into a plurality of microbursts based at least on a count of worker threads corresponding to a plurality of queues and a shaper bandwidth. The plurality of queues constitutes the shaper queue.

16 Claims, 3 Drawing Sheets

MULTI-THREADED TRAFFIC SHAPER

FIELD OF THE INVENTION

The embodiments discussed in the present disclosure are generally related to shapers for shaping traffic. In particular, the embodiments discussed are related to Quality of Service (QoS) solutions associated with shaping of multi-threaded traffic queues.

BACKGROUND OF THE INVENTION

Existing packet processing techniques in a network processor implement QoS framework in blocks such as, policer, dropper, and scheduler. The scheduler block is typically implemented on the transmission side just before the transmission stage. The primary purpose of the scheduler block is to prioritize transmission of packets from different users and different traffic classes according to the policy specified by the Service Level Agreements (SLAs) of each network node.

The scheduler block may be similar to a traffic manager block used by network processors that typically implement per flow (or per group of flows) packet queuing and scheduling. It typically acts like a buffer that is able to temporarily store a large number of packets just before their transmission, similar to an enqueue operation. As and when more packets are requested for transmission, the packets are later removed from the temporary storage (queue) and handed over to the transmission side of the Network Interface Card (NIC), with a packet selection logic compliant with the predefined SLAs, similar to a dequeue operation. The scheduler may be optimized for a large number of packet queues in multiple scenarios.

Existing software QoS solutions provide access to the queues by having all enqueue/dequeue operations on the same thread of execution or on multiple threads using a locking mechanism. Each of these solutions have performance penalties such as inefficient processing time.

Therefore, there is a need for an efficient solution for shaping of traffic.

SUMMARY OF THE INVENTION

Embodiments of a computing device for traffic shaping are disclosed. In an embodiment, the computing device includes one or more processor(s) coupled to a memory. The memory includes a set of instructions which when executed causes the one or more processor(s) to divide a burst period associated with a shaper queue into a plurality of microbursts based at least on a count of worker threads corresponding to a plurality of queues and a shaper bandwidth. The plurality of queues constitutes the shaper queue.

In an embodiment, the shaper bandwidth corresponds to a committed information rate (CIR) associated with the computing device. Each of the worker threads corresponds to an instance of a thread of execution for an enqueue and/or a dequeue operation.

In an embodiment, the memory further includes a set of instructions which when executed causes the one or more processor(s) to allocate the plurality of microbursts amongst the plurality of queues. In an embodiment, an enqueue and/or a dequeue operation is simultaneously performed on the worker threads corresponding to the plurality of queues during the burst period.

In an embodiment, the memory further includes a set of instructions which when executed causes the one or more processor(s) to determine a queue size associated with the shaper queue, and set a queue depth for each of the plurality of queues forming the shaper queue based on the queue size of the shaper queue.

In an embodiment, the memory further includes a set of instructions which when executed causes the one or more processor(s) to generate one or more tokens to be filled in a token bucket, and fill the token bucket with the generated one or more tokens after every burst period in such a manner that the one or more tokens in the token bucket correspond to the shaper bandwidth. The one or more tokens are used for a dequeue operation to dequeue packets from the plurality of queues.

In an embodiment, the memory further includes a set of instructions which when executed causes the one or more processor(s) to maintain a token balance that comprises tokens corresponding to a number of bytes that can be transmitted/dequeued during a dequeue operation, subtract bytes transmitted/dequeued during the dequeue operation from the token balance, and add bytes worth a microburst to the token balance from the token bucket.

In an embodiment, the memory further includes a set of instructions which when executed causes the one or more processor(s) to enqueue incoming traffic to be shaped, on the worker threads, simultaneously to the corresponding plurality of queues forming the shaper queue, drop traffic if the incoming traffic exceeds a queue size configured for the respective ones of the plurality of queues, and update the queue size for each of the plurality of queues.

In an embodiment, the memory further includes a set of instructions which when executed causes the one or more processor(s) to dequeue traffic on the worker threads, simultaneously from the plurality of queues forming the shaper queue, and update a number of bytes of traffic transmitted based on the dequeued traffic from the plurality of queues.

BRIEF DESCRIPTION OF THE DRAWINGS

Further advantages of the invention will become apparent by reference to the detailed description of preferred embodiments when considered in conjunction with the drawings.

DETAILED DESCRIPTION

Figure 1:
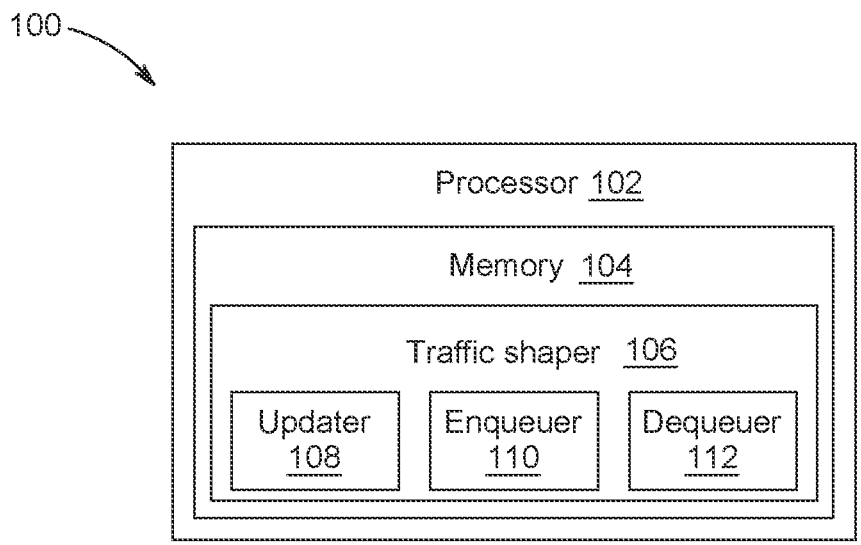
FIG. 1 illustrates a computing device for traffic shaping, according to an example embodiment.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Modern day network processors or network processor units, switches, and routers implement QoS solutions in the packet processing pipeline to solve myriad of issues with queue management of data packets before transmission to the next node. An important aspect of queue management is the shaping of traffic before transmission of the data packets to the next node. Traffic shaping (also referred to as packet shaping) is a bandwidth management technique that delays the flow of certain types of data packets in order to ensure network performance for higher priority applications. Traffic shaping may essentially limit the amount of bandwidth that can be consumed by certain types of applications. In certain scenarios, traffic shaping is primarily used to ensure a high QoS for business-related network traffic. Limited network resources make bandwidth prioritization a necessity. Traffic shaping is one of the techniques to ensure a high QoS for business applications and data.

If a communication link becomes utilized to the point where there is a significant level of congestion, latency may rise substantially. Traffic shaping can be used to prevent such an occurrence and keep latency in check. Therefore, traffic shaping provides a means to control the volume of traffic being sent into a network in a specified period (bandwidth throttling), or the maximum rate at which the traffic is sent (rate limiting). This control can be accomplished in many ways, but traffic shaping is usually achieved by delaying packets. Traffic shaping may be applicable at the network edges (e.g., ingress nodes) to control traffic entering the network, but may also be applied by the traffic source (for example, network card of a source node) or by any element/node in the network. Traffic shaping may also be applied by traffic sources to ensure the traffic they send complies with a contract which may be enforced in the network by traffic policing. Existing QoS solutions for traffic shaping are implemented in devices with dedicated hardware or network processors.

In contrast, proposed embodiments of a traffic shaper may be implemented in a general purpose computing device that may not require a specialized networking hardware. All the disclosed functionalities can be implemented in computing devices with standard processor architecture without any need for dedicated network processors or any other dedicated hardware. In an embodiment, disclosed embodiments of traffic shaper can be implemented in any general purpose computer with a network adaptor.

At a broad level, the traffic shaper includes an enqueuer, a dequeuer, and an updater. Enqueue and dequeue operations may be performed by the enqueuer and the dequeuer simultaneously on multiple threads of execution (hereafter referred to as "worker threads"). Update operations may take place on a single thread (hereafter referred to as "updater thread") which may or may not be one of the threads that are being subjected to enqueueing/dequeuing.

Disclosed embodiments propose a "shaper queue" as an aggregate of multiple queues, one per worker thread. Each queue may be capable of queueing the overall configured "queue depth". Each time the updater runs periodically on the updater thread, it captures snapshot of the queue sizes by summing the per-thread instance (worker thread instance) of each queue. The updater may then calculate the space available in each aggregate queue (i.e., shaper queue) based on its preconfigured depth and may place a limit on each per-thread queue.

In an embodiment, the enqueuer runs on each worker thread and may queue up data/traffic to a set limit, on its per-thread queue, and dropping traffic over the set limit. The dequeuer runs on each worker thread and may dequeue data/traffic from the queue based on token bucket approach described later in the disclosure. In yet another embodiment, a burst period associated with the traffic shaper is split into a plurality of microbursts. At each burst period, a token bucket of the traffic shaper is increased/refilled by a predetermined number of tokens to match overall "shaper rate". At each microburst period, the updater subtracts a microburst worth of bytes at the overall shaper rate from the token bucket and adds it to the shaper's token balance. The dequeuer runs on each instance of worker thread and may transmit as many bytes as are in the token balance maintained by the updater.

Each time the updater runs on the updater thread, it reads the number of bytes that have been transmitted for each aggregate queue by summing the transmitted bytes for each per-thread instance (worker thread) of the queue, and subtracts these from the token balance. In an embodiment, value of the token balance may go negative if multiple worker threads dequeue an aggregate traffic/data over the token balance between two updates. The updater sets the currently active queue for the dequeuer to transmit from during the current burst period. At a minimum, the updater must run once for each burst period and ideally for every microburst period.

Certain terms and phrases have been used throughout the disclosure and will have the following meanings in the context of the ongoing disclosure.

A "queue" may refer to a data structure that is often used in computing for storage and processing of data or packets. In the context of packet processing pipeline, queues may be used to temporarily store the data packets in order to schedule and/or shape the traffic before transmission of the packets from a network processing equipment that is interconnected via communication paths to one or more network nodes. The network may include any number of software and/or hardware elements coupled to each other to establish the communication paths and route data/traffic via the established communication paths.

A "shaper queue" refers to a queue as defined and implemented by a traffic shaping device for the purpose of shaping the traffic before it is transmitted. One or more characteristics associated with the shaper queue may be defined/configured by the traffic shaping device as described later in the description. In an embodiment, the one or more characteristics may include queue depth or queue size, and burst period.

A "worker thread" refers to a per-queue instance of execution that is associated with incoming traffic of packets. It is also referred to as the instance of thread of execution that is being worked upon or executed by an enqueuer and/or a dequeuer during a burst period.

"Traffic" refers to packets that are transmitted over a network by a network node. Further, "incoming traffic" refers to any type of packet that may be received by a network node or a computing device.

Embodiments of a traffic shaping device are disclosed. In an embodiment, the traffic shaping device includes a memory comprising one or more modules executable by a processor coupled to the memory. The one or more modules include an updater configured to realize a shaper queue as an aggregate of a plurality of queues. The plurality of the queues corresponds to a plurality of worker threads. The one or more modules further include an enqueuer configured to perform an enqueue operation simultaneously on the plurality of worker threads. The one or more modules further include a dequeuer configured to perform a dequeue operation simultaneously on the plurality of worker threads. In an embodiment, the enqueue and the dequeue operations are performed once every burst period is associated with the shaper queue.

In an embodiment, the updater is further configured to divide the burst period into a plurality of microbursts based at least on a count of the plurality of worker threads and a shaper bandwidth. In an embodiment, the updater is further configured to advance incoming traffic in each of the plurality of queues in such a manner that none of the plurality of queues have traffic far ahead than the other queues.

The updater is further configured to determine a queue size associated with the shaper queue and set a limit for each of the plurality of queues based on the queue size of the shaper queue. In an embodiment, the limit is set during every microburst period.

The various embodiments throughout the disclosure will be explained in more detail with reference to FIGS. 1-4.

FIG. 1 illustrates an example computing device 100 in which a QoS solution for shaping of traffic may be implemented, according to an example embodiment. The computing device 100 (also referred to as "traffic shaping device" in this description) includes one or more processor(s) 102 coupled to a memory 104 that stores one or more computer executable instructions.

The processor 102 may comprise suitable logic, circuitry, interfaces, and/or code that may be configured to execute a set of instructions stored in the memory 104. The processor 102 may be implemented, based on a number of processor technologies known in the art. Non-limiting examples of the processor 102 may include an X86-based processor, a Reduced Instruction Set Computer (RISC) processor, an Application-Specific Integrated Circuit (ASIC) processor, a Complex Instruction Set Computer (CISC) processor, and/or other processors.

The memory 104 may comprise suitable logic, circuitry, and/or interfaces that may be configured to store a machine code and/or a computer program with at least one code section executable by the processor 102. The memory 104 may be further configured to store one or more codes and set of instructions that may implement embodiments of a traffic shaper 106 as described herein. For example, the memory 104 includes one or more modules that when executed by the processor 102 perform the functions proposed herein for a traffic shaper. For example, the memory 104 is shown to include a traffic shaper 106 that further includes an updater 108, an enqueuer 110, and a dequeuer 112. In accordance with an embodiment, the memory 104 may comprise one or more discrete memory partitions that may comprise set of instructions or codes for one or more functions associated with the general purpose computing device 100. Examples of implementation of the memory 104 may include, but are not limited to, Random Access Memory (RAM), Read-Only Memory (ROM), Hard Disk Drive (HDD), and/or a Secure Digital (SD) card, and other memory technologies known in the art.

In the context of a communication network, one or more nodes in the network may function as a network processing equipment that may also be configured to implement the disclosed embodiments of the traffic shaper 106 or the traffic shaping device 100. It may be noted by those skilled in the art that although the computing device 100 has been shown and described in isolation as a general purpose computing device, the disclosed embodiments of the multi-threaded traffic shaper may be implemented in any standalone network processing equipment/device that manages the scheduling and queuing of traffic as part of QoS packet processing pipeline. Similarly, the disclosed approach for multi-threaded traffic shaping may be applicable wherever there is a need or requirement to regulate or manage the rate at which the data packets are transmitted in a network by a given network node without departing from the scope of the ongoing description.

Specific functionalities of the proposed traffic shaper 106 and the traffic shaping device 100 will be described with reference to FIGS. 1, 2, and 3. As shown in FIG. 1, the traffic shaper 106 has three components/modules: the updater 108, the enqueuer 110, and the dequeuer 112. It may be appreciated by those skilled in the art that the traffic shaper 106 may further include any number of logical components or modules or blocks as required to perform the standard or known functions of traffic shaper apart from the functions disclosed in the ongoing description.

In an embodiment, the traffic shaper 106 may function in two phases: traffic shaper initialization and traffic shaper operation. In particular, the updater 108 performs the $1^{st}$ phase of traffic shaper initialization as a setting-up process for the traffic shaper 106. During this phase, the updater 108 defines the initialization parameters of the traffic shaper 106. For example, the updater 108 may define a burst time period (or burst period "Bp") and a microburst time period (or microburst period "Mp") to be implemented for the traffic shaper 106. In an embodiment, the burst time period Bp corresponds to shaper burst interval or generally a time period that determines the frequency of execution of an "updater thread". The updater thread is a thread instance of execution for executing the updater 108 once every burst period. Certain functionalities may be achieved at every such execution of the updater thread to update the shaper queue (or the plurality of queues comprised therewithin). In an embodiment, the burst time period Bp may be a function of the traffic shaper bandwidth or the committed information rate (CIR).

Disclosed embodiments for traffic shaper propose a concept of a "microburst". A "microburst" refers to a slice of time based on which one or more characteristics/properties of at least one queue in the shaper queue (and hence the shaper queue) can be modified. The proposed modification of characteristics of the at least one queue may be with respect to a rate at which packets can be enqueued/dequeued and a duration for which the enqueue/dequeue operation may be performed. A microburst defines a "configurable" level of temporal granularity based on which traffic associated with the at least one queue in the shaper queue can be updated.

In an embodiment, during the traffic shaper initialization, the updater 108 divides the burst time period into a plurality of microbursts. Such a division may be based at least on the number of worker threads (or queues corresponding to the worker threads) and the traffic shaper bandwidth. Traffic shaper bandwidth may be pre-set or pre-configured and is a function of CIR. In one illustrative example, a burst time period (Bp) of 10 ms may be divided into 200 microbursts of 50 microseconds each. In another example, the burst time period (Bp) of 10 ms may be divided into 500 microbursts of 20 microseconds each.

Figure 2:
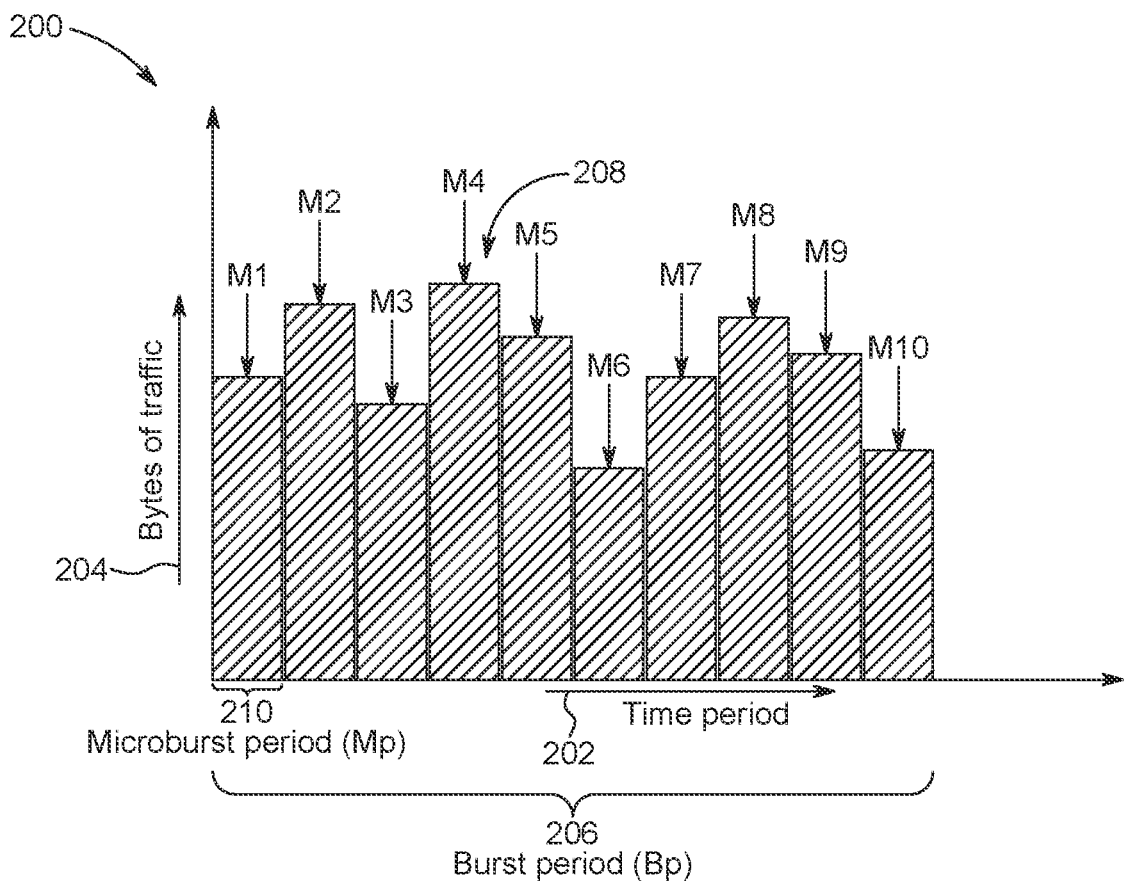
FIG. 2 illustrates a concept of microburst as implemented in embodiments of the disclosure.
Figure 3:
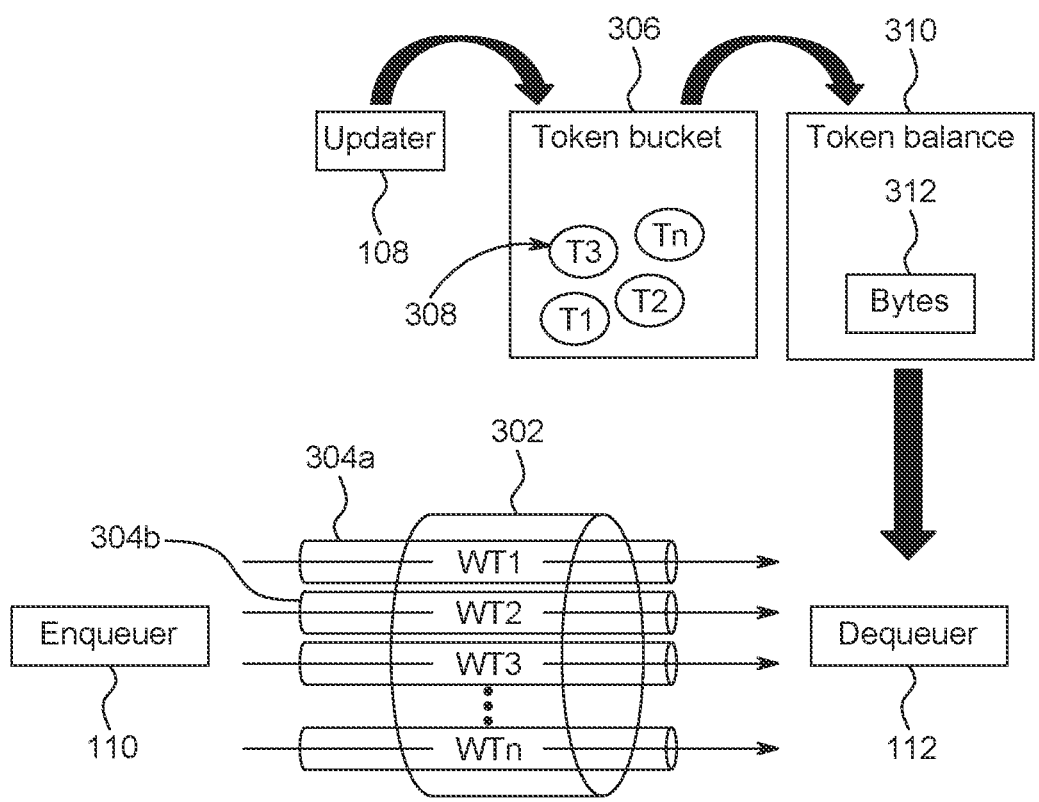
FIG. 3 illustrates an example token bucket mechanism using microbursts as implemented in embodiments of the disclosure.

FIG. 2 illustrates an example of the concept of microburst as implemented in disclosed embodiments. As shown, FIG. 2 shows a graph 200 between time period 202 on the X-axis and bytes of traffic 204 on the Y-axis. A burst period Bp 206 is divided into 10 microbursts 208 (e.g., M1, M2, M3, M4, ..., M10). Each microburst has a microburst period 210 measured as a slice of time (duration) on the X-axis.

Disclosed embodiments further propose and implement a "shaper queue" as an aggregate of multiple queues, one per instance of a worker thread. Each queue may be capable of queueing the overall configured "queue depth" for the shaper queue. The shaper queue enables the traffic shaper 106, as shown in FIG. 1, to provide simultaneous access (for enqueue/dequeue operation) to multiple worker threads during a single burst period thereby eliminating the need for any locking mechanism used in the existing QoS shaping methods and systems. The concept of shaper queue is illustrated in FIG. 3. As shown, shaper queue 302 is constituted by a plurality of queues 304a, 304b, etc., each of which is associated with a worker thread WT1, WT2, . . . WTn, respectively.

In an embodiment, during the traffic shaper initialization, the updater 108 sets a queue depth for the shaper queue 302. Queue depth corresponds to the length of incoming packet in bits/bytes that can be stored in a given queue. As described earlier, the disclosed embodiments propose a shaper queue that is comprised of a plurality of queues corresponding to multiple threads of execution (also referred to as worker threads). In other words, the configured queue size of the shaper queue is an aggregate of the queue sizes of the constituent queues.

Existing QoS shapers have issues with degradation of their QoS when multiple bursts of traffic arrive simultaneously at the traffic shaping device so that multiple bursts compete for the same input and/or output ports or queues. Consequently, long delays may occur for each QoS or packets for each QoS may be dropped due to queue overflow or congestion. Under these circumstances, the existing traffic shapers may not guarantee desirable network's QoS.

To solve the above-highlighted issues, in an embodiment, the updater 108 implements microbursts as described above and runs the updater thread once every microburst period (Mp). Further, the updater 108 refills the token bucket 306 once every burst period (Bp). As described earlier, the updater 108 slices the burst period (Bp) 206 to smaller units referred to as microbursts (Mn) 208. In an embodiment, the updater 108 assigns portions of traffic shaper bandwidth (or microbursts 208) to each of the worker threads associated with the incoming traffic. In other words, the updater 108 spreads or allocates the microbursts (e.g., M1, M2, M3) amongst the worker threads (e.g., T1, T2, T3) based on the incoming traffic and the space available in the corresponding queues. Therefore, each worker thread has its own microburst which it uses during an enqueue operation by the enqueuer 110 as described later in the description.

In an example scenario, one of the worker threads may do all the work and the other worker threads may be idle or may not have enough incoming traffic associated with them. Therefore, it may be desirable to advance all the worker threads all at once (in parallel or simultaneously) in such a manner that none of the worker threads are far too advanced in comparison to the other worker threads. To this end, during the overall burst period, the updater 108 may define one or more positions in the queue for each corresponding worker thread. If any worker thread is way too ahead in the corresponding queue, then the updater 108 is configured to hold or freeze the worker thread thereby allowing some time for other worker threads to catch up and to balance the traffic transfer through the overall shaper queue 302.

In an alternative embodiment, the above noted issue may be solved by the updater 108 during the traffic shaper initialization phase. For example, the updater 108 may keep the microbursts time period (Mp) 210 as small as possible or may keep the number of microbursts (Mn) high. However, there is a tradeoff between forwarding accuracy of the traffic shaping device 100 and the CPU cycles expended by the updater 108 in spreading or distributing the microbursts amongst the worker threads. For example, a high accuracy in forwarding packets or shaper rate may be achieved at the cost of increased CPU time (cycles) or forwarding performance of the traffic shaper 106. This is due to the fact that the same CPU cycles are spent on the forwarding of packets and the updating of the queue (i.e., spreading the microbursts amongst the worker threads). In an exemplary embodiment, the balance between the above mentioned parameters may be inclined more towards the accuracy in forwarding packets or improved shaper rate. In an embodiment, during the traffic shaper initialization phase, the updater 108 determines the preferred microburst period (Mp) (and hence the number of microbursts) based on the shaper bandwidth available and the acceptable trade-off.

Next, the traffic shaper operation phase or $2^{nd}$ phase is executed by the traffic shaper 106 and will be explained with reference to FIGS. 1, 2, and 3. The traffic shaper 106 is configured to shape the packets as they are being transmitted from the computing device 100. In an embodiment, the traffic shaper 106 may include a token bucket 306 that may also be referred to as "CIR bucket".

In an embodiment, during the traffic shaper operation phase, the updater 108 generates token credits at a predetermined rate. The updater 108 may generate and deposit the tokens 308 into the token bucket 306 at a predetermined interval or time period. The predetermined rate at which the tokens 308 are generated and the predetermined interval at which the tokens 308 are deposited into the token bucket 306 may be specified at the time of traffic shaper initialization by the updater 108.

In an embodiment, the predetermined rate for token generation/refill and predetermined interval for depositing tokens may be determined based on SLA and may also be entered by a user of the computing device 100. Each token generated by the updater 108 may serve as a permission ticket to transmit a predetermined number of bits/bytes by the computing device 100. The token bucket 306 includes tokens 308 (e.g., T1, T2) that are periodically added to the buckets by the updater 108 at the predetermined rate.

A token bucket flow may be defined by the rate at which tokens are accumulated and a depth of the token pool in the token bucket 306. The depth of the token pool is equivalent to the number of tokens in the token bucket 306. According to an exemplary embodiment, the number of tokens in the token bucket 306 is equal to the maximum burst size allowed for the traffic shaper 106. The rate of transfer of the packets may depend on parameters that profile the token bucket 306. For example, the parameters may include the CIR and the committed burst size (CBS). Accordingly, the profile of token bucket may be configured by the updater 108 to correspond to these parameters at the time of traffic shaper initialization.

In an embodiment, tokens 308 may be added to the token bucket 306 at the CIR, which corresponds to the average rate of packet transmission for a particular QoS. The CBS may be defined as the maximum number of bytes of data, which may be burst at the CIR so as to not create scheduling concerns. Thus, the updater 108 may insert tokens 308 into the token bucket 306 at the CIR.

When a packet arrives at the computing device 100, the traffic shaper 106 may determine whether there are enough credits/tokens 308 in the token bucket 306 for the packet to be transmitted or whether the packet must be delayed or buffered. If there are a sufficient number of tokens 308 available in the token bucket 306, the updater 108 assigns a specific number of tokens to the packet based upon the size or length of the packet. Further, a number of tokens, which are equivalent to the byte size of the packet, are removed from the token bucket 306 by the updater 108.

For example, a token may correspond to 10 Kbits of data. The updater 108 may set the token rate to 200 tokens/second or 2 Mbps. In another embodiment, a token may be configured to be equal to one byte of data. When the packets received at the computing device 100 exceeds the programmed transfer rate limitations, the excess packets may be buffered by the computing device 100 using known buffering techniques.

During the traffic shaper operation phase, the updater 108 removes the requisite number of tokens from the token bucket 306, which corresponds to the length of the packet, and the packet is transmitted by the dequeuer 112. In an embodiment, when traffic arrives at the computing device 100 and there are sufficient tokens in the token bucket 306, then the traffic is understood to conform to terms of the SLA.

In an embodiment, during the traffic shaper operation phase, the updater 108 may replenish or refill the tokens 308 of the token bucket 306 at regular intervals depending on the CIR. In a scenario when the token bucket 306 is already full of tokens, incoming tokens may overflow the token bucket 306. However, this overflow of excess tokens may not be available as future packets. Thus, at any time, the largest burst of traffic that can be transmitted by the computing device 100 into network may correspond to the (configured) size of the token bucket 306. In an exemplary embodiment, the updater 108 refills the token bucket 306 with tokens every full burst period Bp.

Further, the updater 108 maintains a "token balance" 310 every microburst period Mp and adds a microburst worth of bytes (e.g. bytes 312 i.e., tokens from the token bucket 306) to the token balance 310. The updater 108 subtracts, from the token balance 310, the number of tokens corresponding to packets that have been dequeued by the dequeuer 112 based on the transmission of packets. The deficit in the balance is made up for by the updater 108 by adding the exact number of tokens from the token bucket 306 and so on.

In an embodiment, the updater 108 configures the depth for each queue associated with the worker threads to maintain enough queue depth in each queue. The queue depth as used herein refers to the number of bits/bytes that a given queue can hold. Optimal depth configuration by updater 108 may be important since the incoming packets may arrive at any queue (corresponding to an instance of worker thread) amongst the queues that make up the shaper queue. There needs to be enough physical queue depth on every queue to carry the depth of the whole shaper queue. Herein, the depth of the shaper queue or size of the shaper queue is configured by the updater 108 based at least on the traffic shaper bandwidth or CIR.

In an embodiment, the updater 108 snapshots the queue sizes of all the queues constituting the shaper queue and sets a limit over each queue. Consequently, there may be physically enough space in each queue for more traffic than the amount of traffic being enqueued across the worker threads by the enqueuer 110 at any instant. This sets a limit on how much traffic is allowed during the next microburst.

In an embodiment, the updater 108 sets a given queue for a dequeue operation by the dequeuer 112 based on a priority level associated with the given queue. For example, the queues may be associated with traffic that are associated with different priority levels or class of traffic, such as, but not limited to, high, medium, and low priority.

During the traffic shaper operation phase, the enqueuer 110 and the dequeuer 112 perform the enqueue and dequeue operations respectively on multiple worker threads based on the updated queues and corresponding parameters. The enqueuer 110 simply enqueues incoming traffic onto the plurality of queues one per worker thread of execution. Similarly, the dequeuer 112 dequeues traffic from the plurality of queues one per worker thread of execution and sends for transmissions. The updater 108 runs the updater thread of execution every burst period and updates the shaper queue and instructs the enqueuer 110 and the dequeuer 112 periodically. For example, the updater 108 determines the amount of traffic that can be enqueued or forwarded during the next burst period based on a snapshot of queue sizes of each queue forming the shaper queue. Similarly, the updater 108 determines the amount of traffic that can be transmitted by the dequeuer 112 during the next burst period based on the token balance maintained by the updater 108.

During the updater thread execution, the enqueuer 110 determines the amount of space available in any given queue since there may be certain queues that may be empty or not completely full. The updater 108 compares the available space with the configured queue depth of the given queue to set a limit for each of the queues forming the shaper queue. This limit determines the amount of traffic that can be enqueued in the given queue during the next microburst. In an embodiment, the updater 108 may set the limit for a given queue or each corresponding worker thread every microburst. As described earlier, the number of microbursts and the microburst period can be fixed or configured at the time of traffic shaper initialization based on a number of worker threads corresponding to queues forming the shaper queue and the shaper bandwidth. In an embodiment, the updater 108 can re-configure the number of microbursts and the microburst period at any time based on the number of worker threads to attune the shaper's performance in terms of forwarding accuracy of shaper.

Similarly, during the updater thread execution, the dequeuer 112 determines the tokens available to dequeue traffic and forward for transmission. In an embodiment, the dequeuer 112 dequeues one particular queue at a time based on the tokens available. In an embodiment, a selection of queue for a dequeuing operation is based on the priority levels pre-assigned to the queues. For instance, a queue with a high priority may be dequeued first and a queue with a low priority may be dequeued later and so on.

Figure 4A:
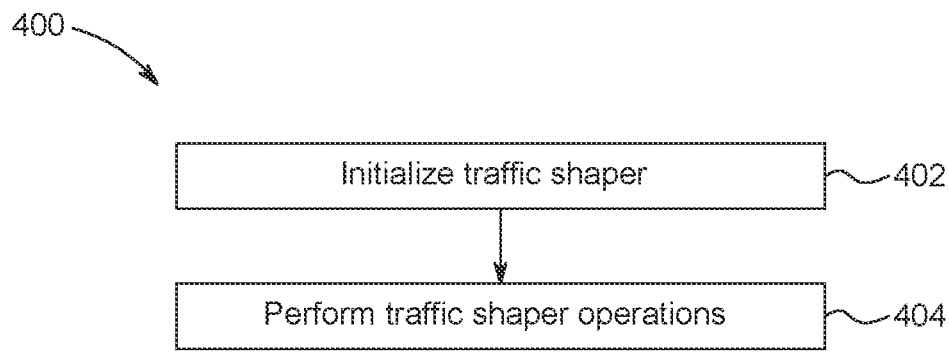
FIGS. 4A & 4B illustrate methods for shaping of incoming traffic in accordance with an embodiment of the disclosure.
Figure 4B:
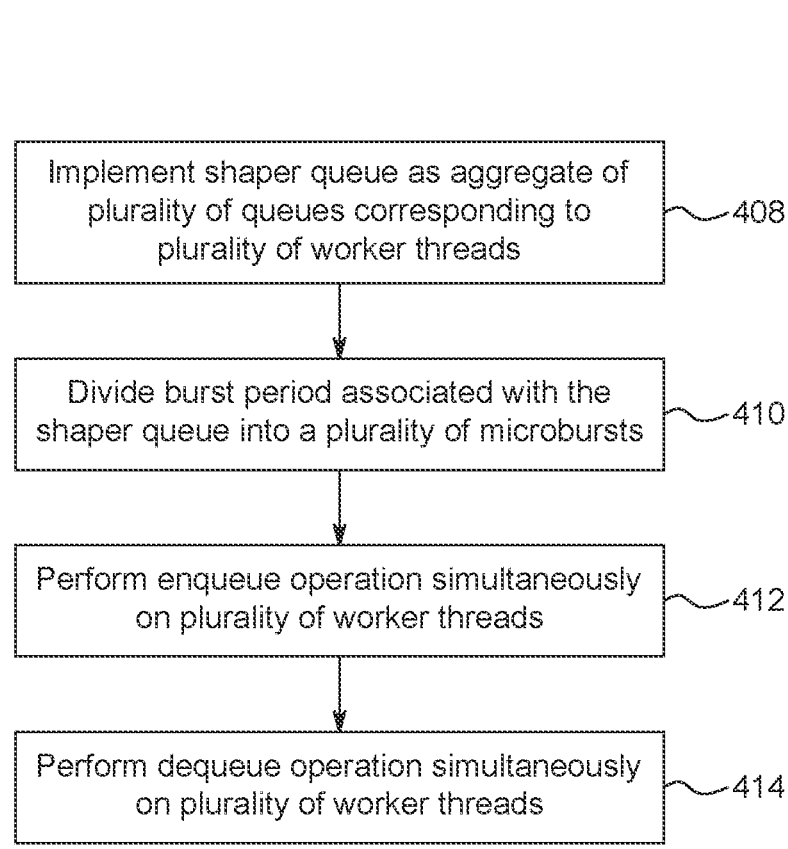

FIGS. 4A and 4B illustrate methods for shaping of incoming traffic in accordance with an embodiment of the disclosure. Particularly, FIG. 4A shows a method 400 of shaping incoming traffic in 2 phases as described earlier.

At step 402, the traffic shaper is initialized, or a traffic shaper initialization phase is executed by the traffic shaper 106. For example, the updater 108 defines the initialization parameters of the traffic shaper 106. In an embodiment, the updater 108 may define a burst time period (or burst period "Bp") and a microburst time period (or microburst period "Mp") to be implemented for the traffic shaper 106. In an embodiment, the burst time period (Bp) corresponds to shaper burst interval or generally a time period that determines the frequency of execution of the "updater thread".

In an embodiment, during the traffic shaper initialization, the updater 108 divides the burst time period into a plurality of microbursts. In an embodiment, during the traffic shaper initialization, the updater 108 sets a queue depth for the shaper queue 302. In an embodiment, the updater 108 assigns portions of traffic shaper bandwidth (or microbursts 208) to each of the worker threads associated with the incoming traffic. In one of the embodiments, during the overall burst period, the updater 108 defines one or more positions, in the corresponding queue, for each worker thread. If any worker thread is way too ahead in the corresponding queue, then the updater 108 is configured to hold or freeze the worker thread thereby allowing some time for other worker threads to catch up and to balance the traffic transfer through the overall shaper queue 302.

In an alternative embodiment, the updater 108 may keep the microbursts time period (Mp) 210 as small as possible or may keep the number of microbursts (Mn) high. However, there may be tradeoff between forwarding accuracy of the traffic shaping device 100 and the CPU cycles expended by the updater 108 in spreading or distributing the microbursts amongst the worker threads.

At step 404, the traffic shaper operation phase or $2^{nd}$ phase is executed by the traffic shaper 106. In an embodiment, the enqueuer 110 and the dequeuer 112 perform the enqueue and dequeue operations simultaneously on the plurality of worker threads. In an embodiment, during the traffic shaper operation phase, the updater 108 generates token credits at a predetermined rate. The updater 108 may generate and deposit the tokens 308 into the token bucket 306 at a predetermined interval or time period.

In an embodiment, during the traffic shaper operation phase, the updater 108 configures the depth for each queue associated with the worker threads to maintain enough queue depth in each queue. In an embodiment, the updater 108 snapshots the queue sizes of all the queues constituting the shaper queue and sets a limit over each queue.

During the traffic shaper operation phase, the enqueuer 110 and the dequeuer 112 perform the enqueue and dequeue operations respectively on multiple worker threads based on the updated queues and corresponding parameters. The enqueuer 110 simply enqueues incoming traffic onto the plurality of queues one per worker thread of execution. Similarly, the dequeuer 112 dequeues traffic from the plurality of queues one per worker thread of execution and sends for transmissions. The updater 108 runs the updater thread of execution every burst period and updates the shaper queue and instructs the enqueuer 110 and the dequeuer 112 periodically. For example, the updater 108 determines the amount of traffic that can be enqueued or forwarded during the next burst period based on a snapshot of queue sizes of each queue forming the shaper queue. Similarly, the updater 108 determines the amount of traffic that can be transmitted by the dequeuer 112 during the next burst period based on the token balance maintained by the updater 108.

During the updater thread execution, the enqueuer 110 determines the amount of space available in any given queue since there may be certain queues that may be empty or not completely full. The updater 108 compares the available space with the configured queue depth of the given queue to set a limit for each of the queues forming the shaper queue. In an embodiment, the updater 108 may set the limit for a given queue or each corresponding worker thread every microburst. Similarly, during the updater thread execution, the dequeuer 112 determines the tokens available to dequeue traffic and forward for transmission. Accordingly, the dequeuer 112 dequeues one particular queue at a time based on the tokens available.

FIG. 4B shows yet another method 406 for shaping of incoming traffic in accordance with an embodiment. At step 408, the updater 108 implements a shaper queue as an aggregate of plurality of queues corresponding to plurality of worker threads. At step 410, the updater 108 divides the burst period associated with the shaper queue into a plurality of microbursts. At step 412, the enqueuer 110 performs enqueue operation simultaneously on plurality of worker threads. At step 414, the dequeuer 112 performs dequeue operation simultaneously on plurality of worker threads.

Embodiments of a method for shaping of incoming traffic are disclosed. In an embodiment, the method includes implementing a shaper queue as an aggregate of a plurality of queues. The plurality of queues corresponds to a plurality of worker threads. The method further includes performing an enqueue operation simultaneously on the plurality of worker threads. The method further includes performing a dequeue operation simultaneously on the plurality of worker threads. The enqueue and the dequeue operations are performed once every burst period is associated with the shaper queue.

In an embodiment, the method further includes dividing the burst period associated with the shaper queue into a plurality of microbursts based at least on a count of the plurality of worker threads and a shaper bandwidth. In an embodiment, the method further includes advancing incoming traffic in each of the plurality of queues in such a manner that none of the plurality of queues have traffic far ahead than the other queues.

In an embodiment, the method further includes determining a queue size associated with the shaper queue and setting a limit for each of the plurality of queues forming the shaper queue based on the queue size of the shaper queue. In an embodiment, each queue of the plurality of queues is configured to queue overall configured queue depth associated with the shaper queue. In an embodiment, the method further includes executing an updater thread to determine queue sizes of the plurality of queues. In an embodiment, the method further includes calculating available space in the shaper queue based on a configured depth of the shaper queue and the determined queue sizes of the plurality of queues.

The proposed solution utilizes an aggregate of per-thread queues to make up a single shaper queue. In addition, the disclosed embodiments involve splitting the shaper burst period into microbursts. The proposed solution also allows multiple threads of execution to enqueue or dequeue traffic to/from a shaper queue simultaneously without any locking mechanism.

There are many advantages of the proposed solution. For example, the disclosed embodiments avoid the need to move all the traffic through a shaper on a single thread of execution. In addition, the proposed solution avoids the need for a locking mechanism to access the queues.

The disclosed methods and steps may be performed by processing logic that may include hardware (circuitry, dedicated logic, etc.), software (such as run on a general-purpose computer system or a dedicated machine), or a combination of both. The processing logic may be included in any node or device (e.g., core node, CPEs, controller, etc.), or any other computing system or device. A person with ordinary skill in the art will appreciate that the disclosed method is capable of being stored on an article of manufacture, such as a non-transitory computer-readable medium. In an embodiment, the article of manufacture may encompass a computer program accessible from a storage media or any computer-readable device.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition, or step being referred to is an optional (not required) feature of the invention.

The present disclosure has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the SP network architecture described herein contain optional features that can be individually or together applied to any other embodiment shown or contemplated here to be mixed and matched with the features of that architecture.

While the invention has been described with respect to a limited number of embodiments, those skilled in the art, having benefit of this disclosure, will appreciate that other embodiments can be devised which do not depart from the scope of the invention as disclosed herein.

We claim:

1. A computing device for traffic shaping, the computing device comprising:
   one or more processor(s) coupled to a memory, wherein the memory comprises a set of instructions which when executed causes the one or more processor(s) to:
   divide a burst period associated with a shaper queue into a plurality of microbursts based at least on a count of worker threads corresponding to a plurality of queues and a shaper bandwidth, wherein the plurality of queues constitutes the shaper queue;
   generate one or more tokens to be filled in a token bucket;
   fill the token bucket with the generated one or more tokens after every burst period in such a manner that the one or more tokens in the token bucket correspond to the shaper bandwidth, wherein the one or more tokens are used for a dequeue operation to dequeue packets from the plurality of queues;
   maintain a token balance that comprises tokens corresponding to a number of bytes that can be dequeued during a dequeue operation;
   subtract bytes dequeued during the dequeue operation from the token balance; and
   add bytes worth a microburst to the token balance from the token bucket.

2. The computing device as claimed in claim 1, wherein the shaper bandwidth corresponds to a committed information rate (CIR) associated with the computing device.

3. The computing device as claimed in claim 1, wherein each of the worker threads corresponds to an instance of a thread of execution for an enqueue and/or a dequeue operation.

4. The computing device as claimed in claim 1, wherein the memory further comprises a set of instructions which when executed causes the one or more processor(s) to:
   allocate the plurality of microbursts amongst the plurality of queues, wherein an enqueue and/or a dequeue operation is simultaneously performed on the worker threads corresponding to the plurality of queues during the burst period.

5. The computing device as claimed in claim 1, wherein the memory further comprises a set of instructions which when executed causes the one or more processor(s) to:
   determine a queue size associated with the shaper queue; and
   set a queue depth for each of the plurality of queues forming the shaper queue based on the queue size of the shaper queue.

6. The computing device as claimed in claim 1, wherein the memory further comprises a set of instructions which when executed causes the one or more processor(s) to:
   enqueue incoming traffic to be shaped, on the worker threads, simultaneously to the corresponding plurality of queues forming the shaper queue;
   drop traffic if the incoming traffic exceeds a queue size configured for the respective ones of the plurality of queues; and
   update the queue size for each of the plurality of queues.

7. The computing device as claimed in claim 6, wherein the memory further comprises a set of instructions which when executed causes the one or more processor(s) to:
   dequeue traffic on the worker threads, simultaneously from the plurality of queues forming the shaper queue; and
   update a number of bytes of traffic transmitted based on the dequeued traffic from the plurality of queues.

8. A traffic shaping device comprising:
   a memory comprising one or more modules executable by a processor coupled to the memory, the one or more modules comprising:
   an updater configured to:
   realize a shaper queue as an aggregate of a plurality of queues, the plurality of queues corresponding to a plurality of worker threads;
   divide a burst period into a plurality of microbursts based at least on a count of the plurality of worker threads and a shaper bandwidth;
   generate one or more tokens to be filled in a token bucket;
   fill the token bucket with the generated one or more tokens after every burst period in such a manner that the one or more tokens in the token bucket correspond to the shaper bandwidth, wherein the one or more tokens are used for a dequeue operation to dequeue packets from the plurality of queues;
   maintain a token balance that comprises tokens corresponding to a number of bytes that can be dequeued during a dequeue operation;
   subtract bytes dequeued during the dequeue operation from the token balance; and
   add bytes worth a microburst to the token balance from the token bucket;
   an enqueuer configured to perform an enqueue operation simultaneously on the plurality of worker threads; and
   a dequeuer configured to perform a dequeue operation simultaneously on the plurality of worker threads, wherein the enqueue and the dequeue operations are performed once every burst period associated with the shaper queue.

9. The traffic shaping device of claim 8, wherein the updater is further configured to advance incoming traffic in each of the plurality of queues in such a manner that none of the plurality of queues have traffic far ahead than the other queues.

10. The traffic shaping device of claim 8, wherein the updater is further configured to:
   determine a queue size associated with the shaper queue; and
   set a limit for each of the plurality of queues based on the queue size of the shaper queue, wherein the limit is set during every microburst period.

11. A computer-implemented method for shaping of incoming traffic, the method comprising:
   implementing a shaper queue as an aggregate of a plurality of queues, the plurality of queues corresponding to a plurality of worker threads;
   dividing a burst period associated with the shaper queue into a plurality of microbursts based at least on a count of the plurality of worker threads and a shaper bandwidth;
   generating one or more tokens to be filled in a token bucket;
   filling the token bucket with the generated one or more tokens after every burst period in such a manner that the one or more tokens in the token bucket correspond to the shaper bandwidth, wherein the one or more tokens are used for a dequeue operation to dequeue packets from the plurality of queues;
   maintaining a token balance that comprises tokens corresponding to a number of bytes that can be dequeued during a dequeue operation;
   subtracting bytes dequeued during the dequeue operation from the token balance; and
   adding bytes worth a microburst to the token balance from the token bucket;
   performing an enqueue operation simultaneously on the plurality of worker threads; and
   performing a dequeue operation simultaneously on the plurality of worker threads, wherein the enqueue and the dequeue operations are performed once every burst period associated with the shaper queue.

12. The method of claim 11, further comprising:
   advancing the incoming traffic in each of the plurality of queues in such a manner that none of the plurality of queues have traffic far ahead than the other queues.

13. The method of claim 11, further comprising:
   determining a queue size associated with the shaper queue; and
   setting a limit for each of the plurality of queues forming the shaper queue based on the queue size of the shaper queue.

14. The method of claim 11, wherein each queue of the plurality of queues is configured to queue overall configured queue depth associated with the shaper queue.

15. The method of claim 11, further comprising executing an updater thread to determine queue sizes of the plurality of queues.

16. The method of claim 15, further comprising calculating available space in the shaper queue based on a configured depth of the shaper queue and the determined queue sizes of the plurality of queues.

\* \* \* \* \*